(12) United States Patent
Kozlenok (10) Patent No.: US 11,479,408 B2
(45) Date of Patent: Oct. 25, 2022

(54) STORAGE SYSTEM AND ASSOCIATED PLATFORM FEEDER

(71) Applicant: Arrival Limited, London (GB)

(72) Inventor: Alexander Kozlenok, London (GB)

(73) Assignee: Arrival Limited, London (GB)

( * ) Notice: Subject to any disclaimer, the term of this patent is extended or adjusted under 35 U.S.C. 154(b) by 264 days.

(21) Appl. No.: 16/774,837

(22) Filed: Jan. 28, 2020

(65) Prior Publication Data

US 2020/0239230 A1 Jul. 30, 2020

(30) Foreign Application Priority Data

Jan. 28, 2019 (GB) .................................... 1901118

(51) Int. Cl.
  *B65G 1/10* (2006.01)
  *B65G 1/04* (2006.01)
  *B65G 1/06* (2006.01)

(52) U.S. Cl.
  CPC ............ *B65G 1/10* (2013.01); *B65G 1/0492* (2013.01); *B65G 1/06* (2013.01)

(58) Field of Classification Search
  CPC ................................ B65G 1/10; B65G 1/0492
  See application file for complete search history.

(56) References Cited

U.S. PATENT DOCUMENTS

| | | | | |
|---|---|---|---|---|
| 5,002,449 | A * | 3/1991 | Kita | B65G 1/0492 414/273 |
| 9,020,632 | B2 * | 4/2015 | Naylor | B65G 1/0492 700/218 |
| 9,334,113 | B2 * | 5/2016 | Naylor | B65G 1/065 |
| 2018/0334326 | A1 | 11/2018 | Sweet et al. | |

FOREIGN PATENT DOCUMENTS

| | | |
|---|---|---|
| CN | 107284936 | 10/2017 |
| CN | 208249082 | 12/2018 |
| CN | 109436642 | 8/2019 |
| DE | 29903845 | 3/2000 |
| JP | 6108332 | 4/1968 |
| JP | H0485202 | 3/1992 |
| JP | 2006103874 | 4/2006 |
| SU | 537905 | 12/1976 |
| WO | WO2019008999 | 1/2019 |

OTHER PUBLICATIONS

Yokoya, Shigeharu (JP 2006-103874 A) Apr. 6, 2020. English language machine translation retrieved Dec. 14, 2021 from Espacenet. (Year: 2006).*
GB Search and Exam Report for corresponding GB Patent Application No. GB1901118.8 dated Jul. 5, 2019, 5 pages.
EP Search Report for corresponding EP Patent Application No. 20154151.3 dated Jun. 24, 2020, 7 pages.
Office Action from corresponding GB Patent Application No. GB1901118.8 dated Feb. 16, 2021, 3 pages.

* cited by examiner

*Primary Examiner* — Jonathan Snelting
(74) *Attorney, Agent, or Firm* — Lee & Hayes, P.C.

(57) ABSTRACT

The storage assembly has four column structures which may each include a belt mounted on an upper pulley and a lower pulley. The lower pulley of each column is driven by an electric motor, which is synchronized with a controller coupled to logistic-control software system. Shelves are coupled to the belts which are used to hold storage platforms. Parts are placed on the storage platforms which are moved from the storage assembly to robotic vehicles or storage racks.

20 Claims, 6 Drawing Sheets

STORAGE SYSTEM AND ASSOCIATED PLATFORM FEEDER

This Application claims priority to GB patent application no. 1901118.8, filed Jan. 28, 2019, which is incorporated herein by reference.

FIELD OF INVENTION

The field of invention is the storage platform in robotic manufacturing system.

BACKGROUND

In a robotic manufacturing system, robots may be used to assemble components into assembled devices. In order for a robot to assemble the components, all of the necessary components must be available. The coordinated delivery of the components may be difficult if the components are being delivered from various sources. If some components arrive before others, the early components must be stored until all of the components are available. What is needed is a storage platform feeder apparatus and system which allows components to be stored and then delivered to the assembly robot when all components are available.

SUMMARY OF THE INVENTION

According to the present invention there is provided a storage system as claimed in claim 1.

In a preferred embodiment the storage platform feeder device serves for the automatic removal or storage of cargo platforms on a robotic logistics system. In different embodiments, the storage platform feeder device may function as a temporary storage area for components that are waiting to be delivered to other machines or storage areas. For example, in an embodiment, the first to arrive components may be placed on storage platforms delivered by Automatic Guided Vehicles AGVs to a storage assembly which may remove the storage platforms and store the first components. This process may continue until all of the components needed for the assembly are in the storage assembly. The system may then request AGVs to deliver the storage platforms with the components to the assembly robot which may assembly the components. In other embodiments, the storage assembly may be used in other assembly methods.

The storage assembly may include four column structures which may each include a belt. While the invention is described with belts, in other embodiments, chains or any other similar flexible loop structure may be used. The bottom pulley of each column is driven by an electric motor, which in turn are synchronized with a controller. There is a logistic-control software system, which synchronises the cargo load/unload, frames/platforms installation, logistic robots trajectories, and other manufacturing processes. Shelves may be mounted on the belt which may lift and lower the cargo platforms. The storage assembly may store a limited number of cargo platforms and the capacity may depend on the height of the storage assembly. Logistic transportation robots such as automatic guided vehicles (AGVs) may be moved into a loading area of the storage assembly to deliver and/or remove storage platforms which may hold one or more components.

The storage assembly may automatically load and unload the cargo platforms onto or off of AGVs that are moved to a loading gates of the storage assemblies. Cargo platform loading is carried out by lowering the cargo platform in the storage assembly onto AGVs, while the cargo platform is aligned with a coupling mechanism on the tops of the AGVs such as a flange with a centre hole. The fixation of the cargo platform onto AGVs occurs due to the engagement of features on a lower surface of the cargo platform such as a cylinder or rod which may be inserted into a centre hole of a coupling device on the AGVs.

After fixing the cargo platform with coupling devices to the AGVs, the AGVs may remove the platform from the guide shelves of the storage assembly and deliver the components on the cargo platform to an assembly robot where the components may be removed from the cargo platform or other destination. If necessary, once the components have been removed, the AGVs may return the cargo platform back to their storage system. The maximum weight of the load on the platform is limited by the power of the lifting frame and load capacity of the logistic AGVs.

DETAILED DESCRIPTION

Figure 1:
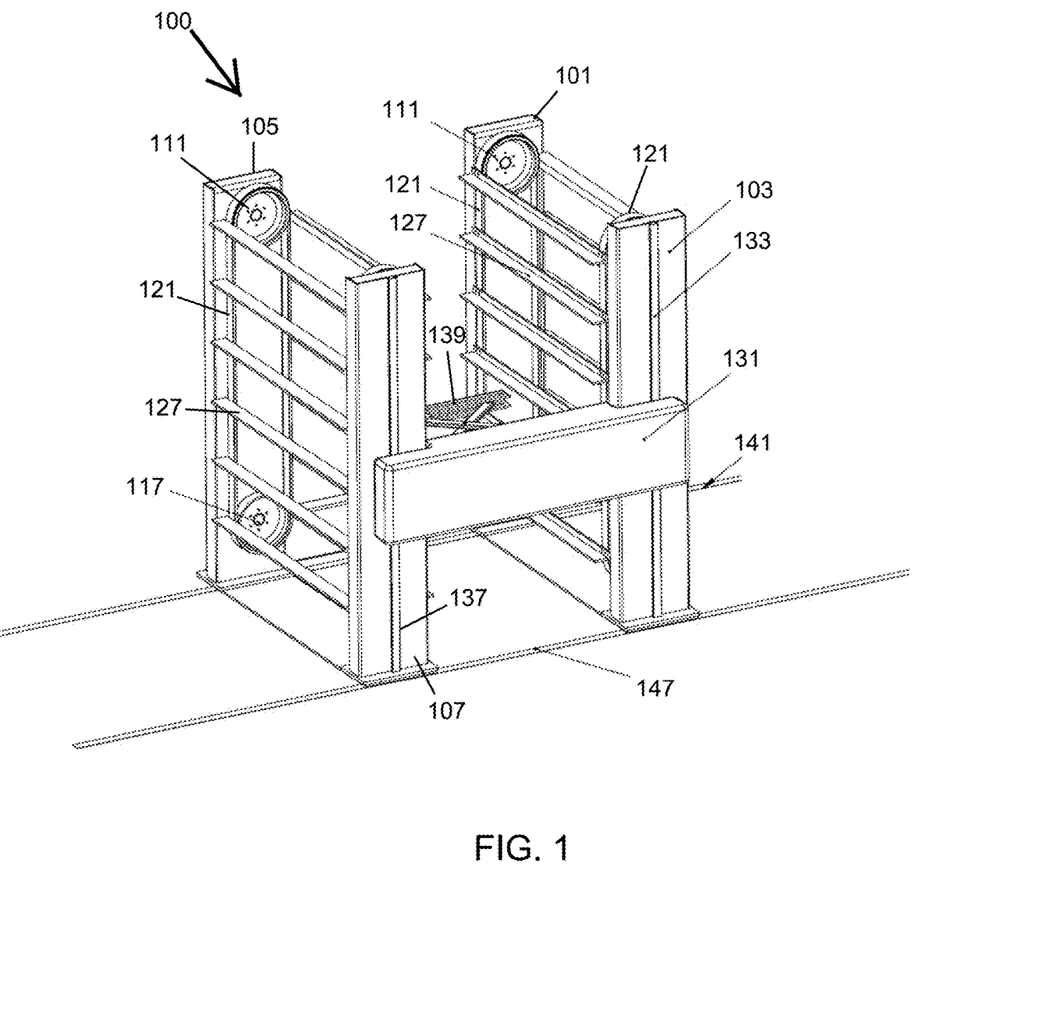
FIG. 1 illustrates a perspective view of an embodiment of a storage assembly.

The present invention is directed towards an automated storage system for removal or installation of cargo platforms or assembly tables on logistic robotic system. With reference to FIG. 1, an embodiment of a storage mechanism assembly 100 is illustrated which may include four vertically oriented columns 101, 103, 105, 107. Each of the columns 101, 103, 105, 107 has a belt 121 which may be a flexible belt, a chain or other loop structure. The loop 212 has an inner surface mounted on an upper pulley 111 and a lower pulley 117.

Horizontal shelves 127 are attached to outer surfaces of the belts 121. Each of the shelves 127 may have a planar support surface which may carry a side portion of a storage platform which may be a planar structure which may fit between the columns 101, 103, 105, 107 and rest on the shelves 127. While the system is illustrated with belts 121 which may be a composite construction with elastomers and laminate fibres, in other embodiments, other rotational mechanisms may be used such as chains or other high strength loop structures.

In an embodiment, the storage assembly may have a first column assembly comprising: a first front column coupled to a first upper pulley and a first lower pulley, a first front belt mounted on the first upper pulley and the first lower pulley, a first rear column coupled to a first upper rear pulley and a first lower rear pulley, a first rear belt mounted on the first upper rear pulley and the first lower rear pulley and a first plurality of shelves mounted to the first front belt and the first rear belt wherein the first plurality of shelves are in a horizontal orientation. The storage assembly may also include a second column assembly comprising: a second front column coupled to a second upper pulley and a second lower pulley, a second front belt mounted on the second upper pulley and the second lower pulley, a second rear column coupled to a second upper rear pulley and a second lower rear pulley, a second rear belt mounted on the second upper rear pulley and the second lower rear pulley, a second plurality of shelves mounted to the second front belt and the second rear belt.

Each of the columns 101, 103, 105, 107 has an internal motor which is coupled to the upper pulley 111 and/or the lower pulley 117 to rotate the belts 121 in a coordinated synchronized manner to move the shelves 127. The motors may be coupled to a controller which may control the motors move the belts 121 coupled to the same shelves 127 in the same direction. However, the motors on the opposite side may rotate the belts 121 in the opposite directions of rotation. More specifically, to raise the shelves 127, the belts 121 on the right side may rotate in a clockwise direction and the belts 121 on the left side may rotate in a counter clockwise direction. Conversely, to lower the shelves 127, the belts 121 on the right side may rotate in a counter clockwise direction and the belts 121 on the left side may rotate in a clockwise direction. The internal motors may be controlled so that the shelves 127 are in a horizontal orientation and the shelves 127 on the first column assembly are substantially parallel to the shelves 127 on the second column assembly while the belts 121 are moving and when the belts 121 are stationary.

The illustrated storage assembly 100 may include a palletiser 131 which may be attached to a first vertical rail 133 coupled to a front surface of the right column 103 and a second vertical rail 137 coupled to a front surface of the left column 107. The palletiser 131 may have a vertical drive mechanism which may move the palletiser 131 up or down on the first vertical rail 133 and the second vertical rail 137. The vertical drive mechanism may include a motor which may rotate in a first direction to move the palletiser 131 up and rotate in an opposite second direction to move the palletiser 131 down. For example, the palletiser 131 may be coupled to rotating threaded screws which are vertically oriented. The threaded screws may be rotated to cause the non-rotating palletiser 131 to move vertically on the first vertical rail 133 and the second vertical rail 137.

The palletiser 131 may include a storage platform movement mechanism 139 which may be coupled to the palletiser 131 to move the storage platforms 201 onto and off of the shelves 127 of the storage assembly 100. The storage platform movement mechanism 139 may be a scissor mechanism which may have a plurality of linkages which are compressed or expanded in a foldable crisscross "X" pattern. A control end of the linkages may be coupled to an actuator. Motion is achieved by the application of pressure to the control end of the inner set of linkages, elongating the crossing pattern, and propelling the work platform horizontally. In an embodiment, the outer linkages may be coupled to a holder structure which may move the storage platforms 201. More specifically, the holder structure may access the storage platforms 201 and the storage platform movement mechanism 139 may be extended to move the storage platforms 201 out of the storage assembly 100 and onto another storage structure. The storage platform movement mechanism 139 may then release the storage platform 201 onto another storage structure and the storage platform movement mechanism 139 may be retracted back into the assembly 100. Conversely, the storage platform movement mechanism 139 may be extended and lift a storage platform 201 from the other storage structure. The storage platform movement mechanism 139 may then be retracted and the storage platform 201 may be moved into the storage assembly 100.

In an embodiment, the storage assembly 100 may have a rolling mechanism which allows the storage assembly 100 to travel on the rails 141. The storage assembly 100 may move to a desired location and the palletiser 131 may access storage platforms 201 and place them on the shelves 127 or conversely remove the storage platforms 201 from the shelves and place them on adjacent storage structures.

Figure 2:
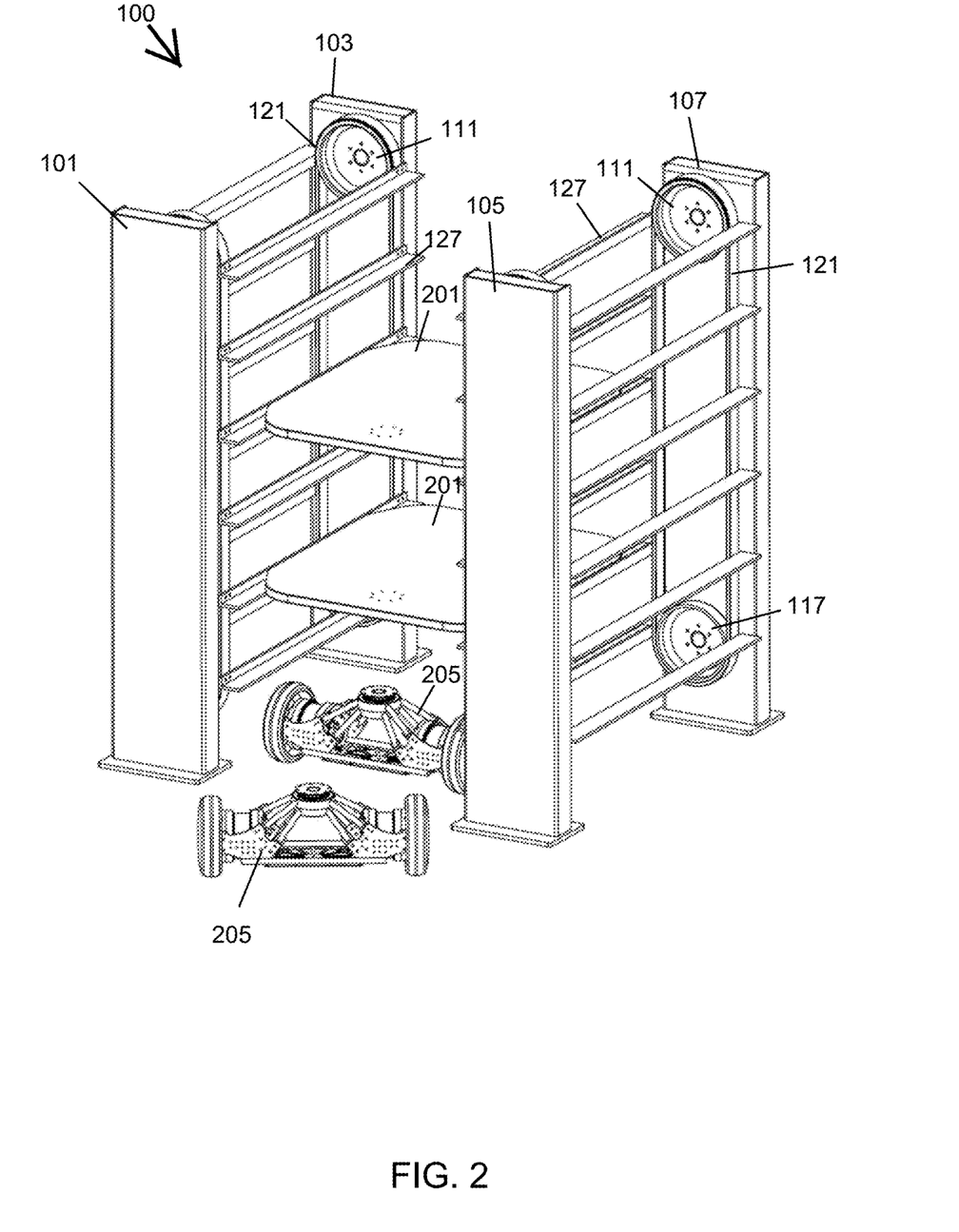
FIG. 2 illustrates a perspective view of an embodiment of a storage assembly with cargo platforms and two AGVs.
Figure 3:
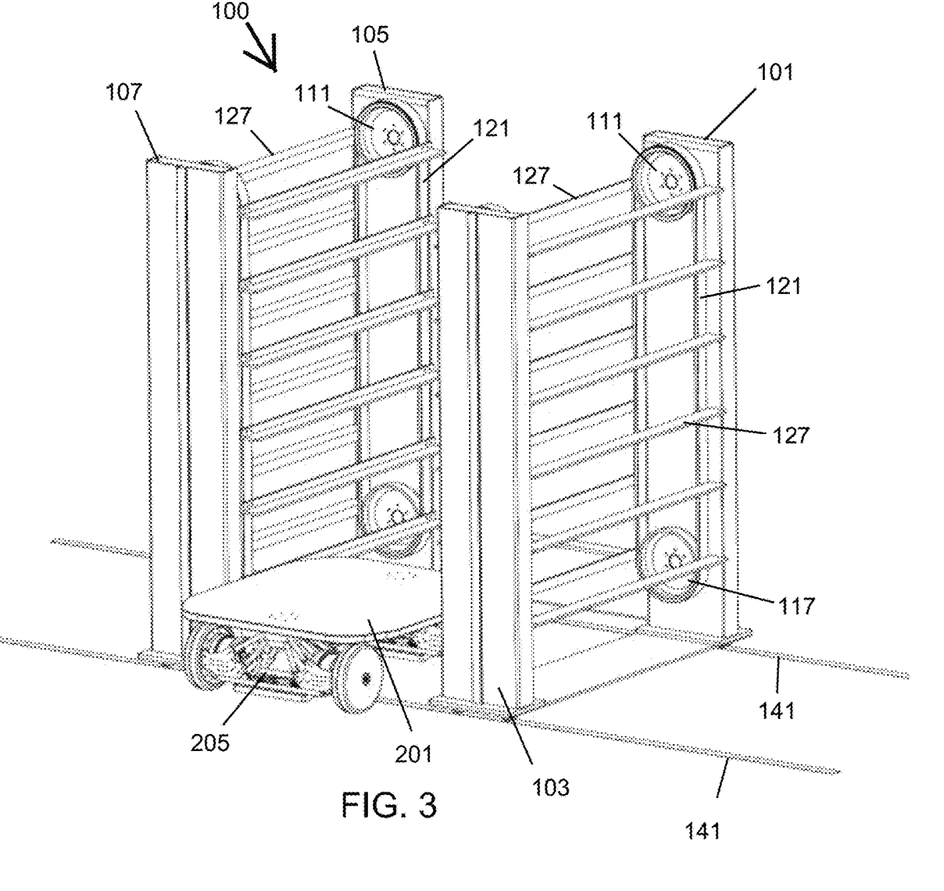
FIG. 3 illustrates a perspective view of an embodiment of a storage assembly with a cargo platform placed on two AGVs.

In different embodiments, the storage assembly 100 may be used with additional system components with or without the palletiser 131. With reference to FIGS. 2 and 3, the storage assembly 100 is shown with AGVs 205 and without the palletiser. In FIG. 2, the storage assembly 100 contains two storage platforms 201 on shelves 127 which have been raised. Two AGVs 205 are being driven below the lower storage platform 201. Once the two AGVs 205 are properly positioned under the lower storage platform 201, the motors may control the pulleys 111, 117 and the belts 121 to rotate so that the lower storage platform 201 may be placed on the two AGVs 205. More specifically, the right belts 121 may rotate in a counter clockwise direction and the left belts 121 may rotate in a clockwise direction to lower inner shelves 127. As the shelves 127 rotate around the lower pulleys 117, the shelves 127 move outward creating more clearance for the shelves 127 to be removed from the storage assembly 100 by the AGVs 205.

The motors may continue to lower the shelves 127 below the support surfaces of the two AGVs 205. In an embodiment, the support surfaces of the AGVs 205 may be a predefined support height. By lowering the lower storage platform 201 below the predefined support height, the weight of the lower storage platform 201 is transferred from the shelves 127 to the two AGVs 205. While the drawings illustrate two AGVs 205 used to transport the lower storage platform 201, in other embodiments, any number of AGVs 205 may be used. For example, if a single AGV 205 is being used, the centre of balance of the storage platform 201 may be placed on the centre of the AGV 205. If four AGVs 205 are being used, the corner areas of the storage platform 201 may be placed over each of the AGVs 205.

With reference to FIG. 3, when the storage platform 201 is placed on the two AGVs 205 and released from the shelves 127, the AGVs 205 may transport the storage platform 201 from the storage assembly 100. The opposite process of removing the storage platform 201 from the AGVs 205 may also be described with reference to FIGS. 3 and 2. With reference to FIG. 3, the AGVs 205 may move the storage platform 201 into the storage assembly 100. Two shelves 127 may be positioned lower than the support surface of the AGVs 205. Once the AGVs 205 are properly positioned in the storage assembly 100, the motors in the columns 101, 103, 105, 107 may rotate the upper pulley 111 and a lower pulley 117 and move the belt 121 and shelves 127 so that upper surfaces of the lower inner shelves 127 may contact lower edge surfaces of the storage platform 201 and lift the storage platform 201 off of the AGVs 205. With reference to FIG. 2, once the storage platform 201 has been lifted off of the AGVs 205, the AGVs 205 may be controlled to move away from the storage assembly 100. In this illustration, the storage assembly 100 is mounted on tracks 141 which may allow the storage assembly 100 to move horizontally.

Figure 4:
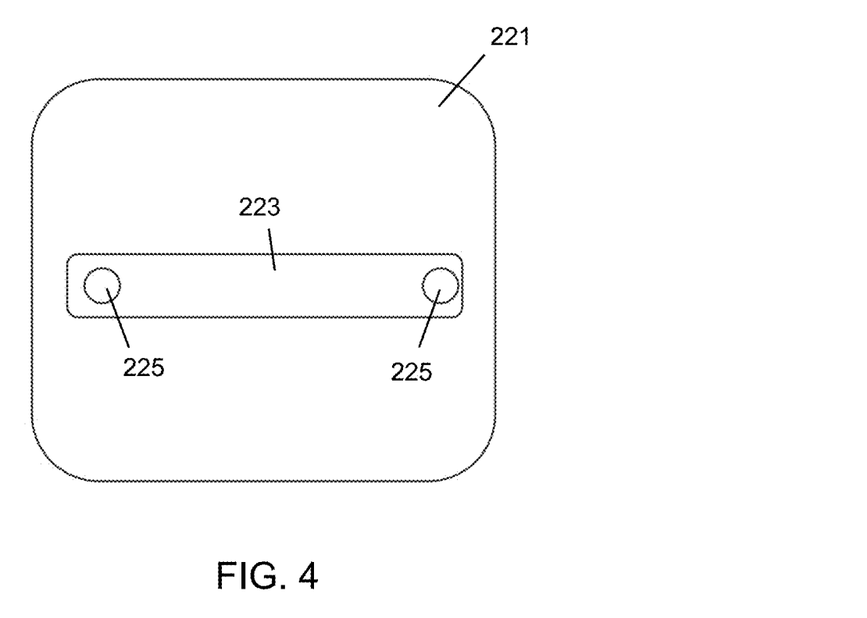
FIG. 4 illustrates bottom view of an embodiment of a cargo platform.
Figure 5:
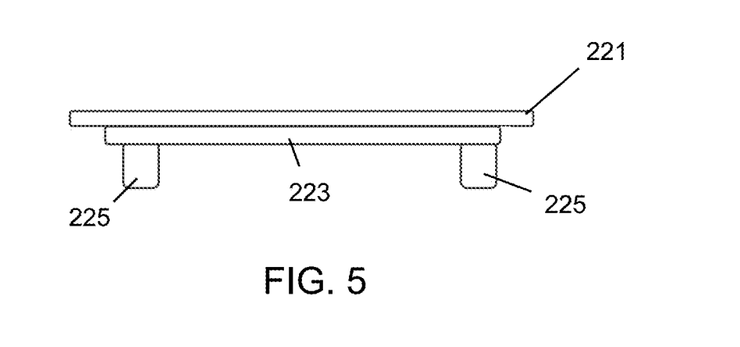
FIG. 5 illustrates side view of an embodiment of a cargo platform.

With reference to FIGS. 4-5, an embodiment of a storage platform 201 may include a planar structure 221 and a lower support beam 223 which includes two cylindrical shafts 225. FIG. 4 illustrates a bottom view and FIG. 5 illustrates a side view of the storage platform 201 which shows the lower support beam 223 and the two cylindrical shafts 225 on a centre line of the planar structure 221. These components may be rigidly coupled to each other. The lower support beam 223 may provide strength to the planar structure 221 to prevent bending when a heavy load is placed on the storage platform 201. The cylindrical shafts 225 are placed into couplings on two AGVs and the lower support beam 223 also provides tension and compression strength so that a pull or a push force may be applied between the two AGVs.

Figure 6:
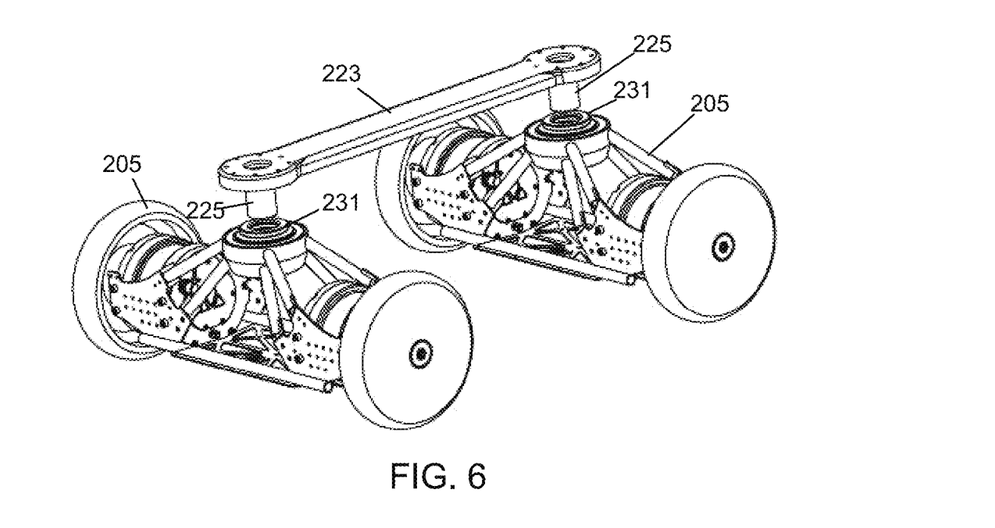
FIG. 6 illustrates a perspective view of a cargo platform coupling over two AGVs.
Figure 7:
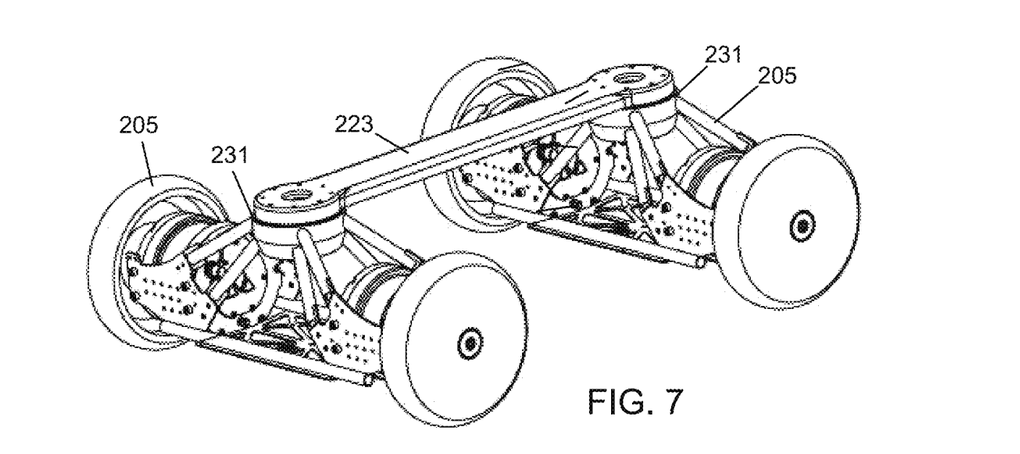
FIG. 7 illustrates a perspective view of a cargo platform coupling inserted into two AGVs.

With reference to FIG. 6, AGVs 205 are illustrated which have couplings 231 and the lower support beam 223 and two cylindrical shafts 225. The storage platform is not shown so that the coupling of the two cylindrical shafts 225 with the couplings 231 may be more clearly illustrated. As discussed, when the storage assembly lowers the storage platform onto the AGVs 205, the two cylindrical shafts 225 are precisely aligned with the holes in the couplings 231. Thus, the AGVs 205 must be precisely moved into the loading area of the storage assembly. With reference to FIG. 7 the storage platform has been lowered onto the AGVs 205 and the two cylindrical shafts 225 are fully inserted into the couplings 231. The couplings 231 may tighten around the two cylindrical shafts 225 when the cylindrical shafts 225 are fully inserted into the couplings 231. When the storage platform is released from the shelves of the storage assembly, the AGVs 205 may be controlled to remove the storage platform from the storage assembly and deliver the storage platform to a desired destination.

Figure 8:
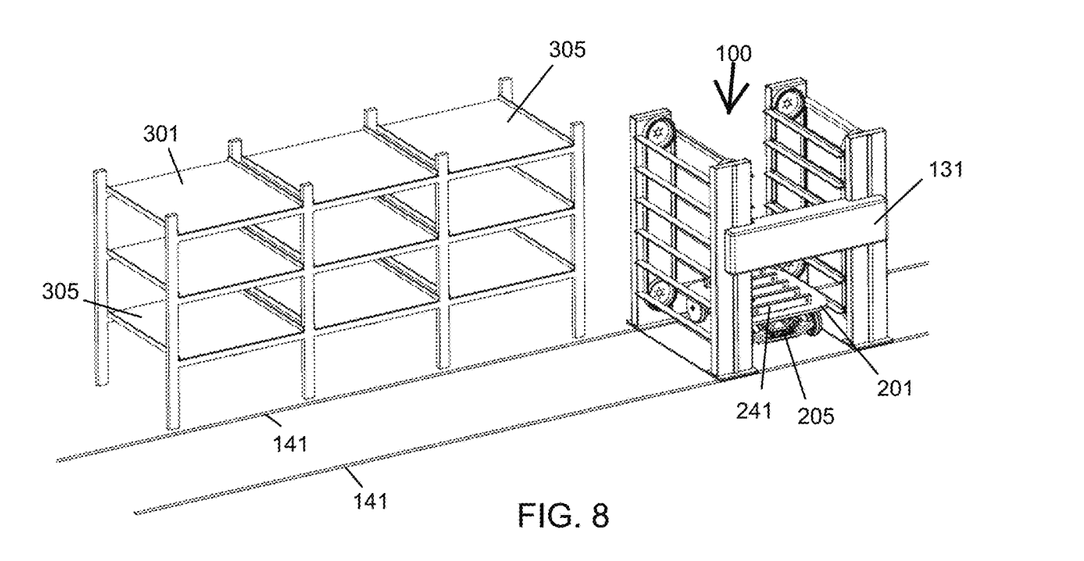
FIG. 8 illustrates an embodiment of a storage assembly with AGVs and a storage rack.
Figure 9:
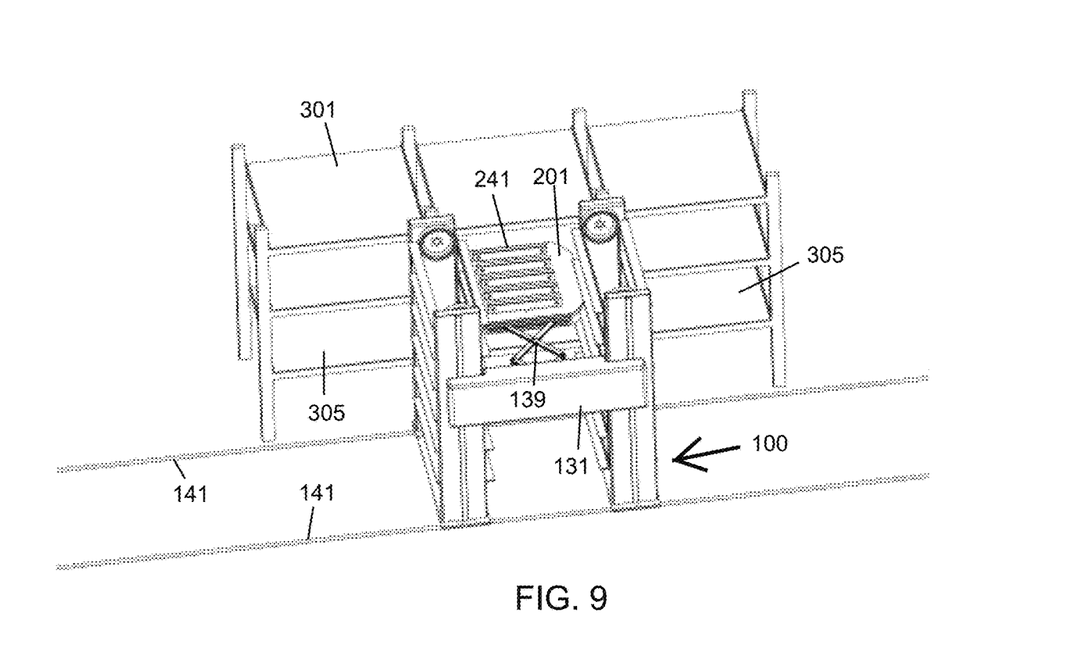
FIG. 9 illustrates an embodiment of a storage assembly with a storage rack.

With reference to FIGS. 8 and 9, in different embodiments, the storage assembly 100 may be retrofitted and serve as a component storage link between the logistics robots, the warehouse system and the external supply system. As parts are delivered to the part assembly location, the parts may be stored in the storage assembly 100 and accessed when all necessary parts have been delivered. For example, in an embodiment, the assembly may temporarily store parts placed on the shelves 127 until the parts are needed in a just in time (JIT) manufacturing process. In an example, the storage assembly 100 may store up to six storage platforms 201 with each storage platform 201 storing different parts. Different AGVs 205 may be used to deliver the different parts placed on each of the storage platforms 201 from various locations to the storage assembly 100 where they are lifted by the storage shelves 127 as described above and stored. As each storage shelve 127 arrives at the storage assembly 100, the storage platform 201 is placed in the next available storage shelves 127 and stored. Once all of the necessary parts on the storage platforms 201 are stored in the storage assembly 100, the system may inform an assembly robot(s) that all of the necessary parts are available and ready for assembly. AGVs 205 may be used to transport the parts on each of the six storage platforms 201 to the robot(s) as described above with the storage assembly 100 lowering each of the storage platforms 201 onto AGVs 205 which then deliver the parts on the storage platforms 201 to the assembly robot.

The described implementation may accommodate up to six storage platforms. However, in other embodiments the storage assembly 100 may be able to store any number of the storage platforms 201 depending on the height of the served storage racks. The storage assembly 100 implementation may automatically install (or replace) the storage platforms (empty or with cargo parts) on logistic robots AGVs 205 that are located in the loading gates of the assembly 100.

In other embodiments as shown in FIGS. 8 and 9, the described assembly 100 may be used with a storage rack 301. As described above, the storage assembly 100 may have a rolling mechanism which allows the storage assembly 100 to travel on the rails 141 in horizontal directions. In FIG. 8, the storage assembly 100 may move to a pickup location where AGVs 205 have delivered a storage platform 201 containing parts 241. The storage assembly 100 may lift the storage platform 201 and parts 241 from the AGVs 205. The AGVs 205 may then travel away from the storage assembly 100 so the storage assembly 100 may move on the tracks 141.

With reference to FIG. 9, the storage assembly 100 may travel on the rails 141 to a location adjacent to the storage rack 301 which may have a plurality of storage shelves 305 which are arranged in an array of rows and columns. In the illustrated example, the storage assembly 100 has moved to the centre column and the palletiser 131 has extended the movement mechanism 139 and the storage platform 201 so that the palletiser 131 places the storage platform 201 with parts 241 on the adjacent storage shelf 305. Once the storage platform 201 rests on the storage shelf 305, the movement mechanism 139 of the palletiser 131 may be retracted away from the storage rack 301 and back into the storage assembly 100 so that the storage assembly 100 may move on the tracks 141. The described process may be repeated.

Conversely, when the parts 309 are needed, the storage platform 201 may be accessed by the storage assembly 100 and delivered to the AGVs 205 which may bring the parts to the desired location. With reference to FIG. 5, the storage assembly 100 may move to the storage rack column which is storing the desired parts. The palletiser 131 may move to the row on the storage rack 301 where the desired parts are being stored or conversely remove the storage platforms 201 from the shelves and place them on adjacent storage structures.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

The invention claimed is:

1. An automated storage system in a robotic manufacturing system, comprising:
   a first column assembly comprising:
   a first front column coupled to a first upper pulley and a first lower pulley;
   a first front belt mounted on the first upper pulley and the first lower pulley;
   a first rear column coupled to a first upper rear pulley and a first lower rear pulley;

a first rear belt mounted on the first upper rear pulley and the first lower rear pulley;

a first plurality of shelves mounted to the first front belt and the first rear belt, wherein the first plurality of shelves are in a horizontal orientation;

a second column assembly comprising:

a second front column coupled to a second upper pulley and a second lower pulley;

a second front belt mounted on the second upper pulley and the second lower pulley;

a second rear column coupled to a second upper rear pulley and a second lower rear pulley;

a second rear belt mounted on the second upper rear pulley and the second lower rear pulley;

a second plurality of shelves mounted to the second front belt and the second rear belt, wherein the second plurality of shelves are in a horizontal orientation and substantially parallel to the first plurality of shelves;

a palletiser coupled to a first vertical rail on the first front column and a second vertical rail on the second front column, wherein the palletiser moves vertically on the first vertical rail and the second vertical rail;

a plurality of storage platforms wherein each of the plurality of storage platforms is configured to be placed on one of the first plurality of shelves and one of the second plurality of shelves, wherein each of the shelves is configured to carry a side portion of a storage platform; and robotic vehicles for transporting the storage platforms, wherein the robotic vehicles are positioned in a loading area between the first column assembly and the second column assembly to remove the storage platforms from the first plurality of shelves and the second plurality of shelves or to load the storage platforms onto the first plurality of shelves and the second plurality of shelves.

2. The automated storage system of claim 1 further comprising:

a first motor coupled to the first upper pulley or the first lower pulley; and a second motor coupled to the second upper pulley or the second lower pulley.

3. The automated storage system of claim 2 further comprising:

a controller coupled to the first motor and the second motor for controlling and synchronizing movements of the first motor and the second motor.

4. The automated storage system of claim 1 wherein the palletiser comprises a push mechanism for pushing a storage platform from one of the first plurality of shelves and one of the second plurality of shelves.

5. The automated storage system of claim 1 wherein the palletiser comprises a scissor mechanism for moving a storage platform onto and off of one of the first plurality of shelves and one of the second plurality of shelves.

6. The automated storage system of claim 1 wherein the robotic vehicles comprise couplings for coupling to cylindrical structures extending from the storage platforms.

7. The automated storage system of claim 1 wherein a storage platform is transported by two robotic vehicles, a first robotic vehicle and a second robotic vehicle, and the shelves are configured to remove the storage platform from the first robotic vehicle and the second robotic vehicle.

8. The automated storage system of claim 1, further comprising:

a front horizontal track wherein front portions of the first column assembly and the second column assembly move over the front horizontal track; and a rear horizontal track wherein rear portions of the first column assembly and the second column assembly move over the rear horizontal track.

9. The automated storage system of claim 8, wherein the palletiser loads and unloads the storage platforms from the first plurality of shelves and the second plurality of shelves.

10. The automated storage system of claim 9 further comprising:

a plurality of storage racks placed adjacent to the rear horizontal track wherein the plurality of storage racks includes storage shelves arranged in a vertical and a horizontal array and wherein the palletiser places the storage platforms on the storage shelves of the plurality of racks and the palletiser may remove storage platforms from the storage shelves of the plurality of racks.

11. An automated storage system in a robotic manufacturing system, comprising:

a first column assembly comprising:

a first front column coupled to a first upper pulley and a first lower pulley;

a first front belt mounted on the first upper pulley and the first lower pulley;

a first rear column coupled to a first upper rear pulley and a first lower rear pulley;

a first rear belt mounted on the first upper rear pulley and the first lower rear pulley;

a first plurality of shelves mounted to the first front belt and the first rear belt, wherein the first plurality of shelves are in a horizontal orientation;

a second column assembly comprising:

a second front column coupled to a second upper pulley and a second lower pulley;

a second front belt mounted on the second upper pulley and the second lower pulley;

a second rear column coupled to a second upper rear pulley and a second lower rear pulley;

a second rear belt mounted on the second upper rear pulley and the second lower rear pulley;

a second plurality of shelves mounted to the second front belt and the second rear belt, wherein the second plurality of shelves are in a horizontal orientation and substantially parallel to the first plurality of shelves;

a plurality of storage platforms wherein each of the plurality of storage platforms is configured to be placed on one of the first plurality of shelves and one of the second plurality of shelves, wherein each of the shelves is configured to carry a side portion of a storage platform;

robotic vehicles for transporting the storage platforms, wherein the robotic vehicles are positioned in a loading area between the first column assembly and the second column assembly to remove the storage platforms from the first plurality of shelves and the second plurality of shelves or to load the storage platforms onto the first plurality of shelves and the second plurality of shelves;

a front horizontal track wherein front portions of the first column assembly and the second column assembly move over the front horizontal track; and a rear horizontal track wherein rear portions of the first column assembly and the second column assembly move over the rear horizontal track.

12. The automated storage system of claim 11 further comprising:

a first vertical rail on the first front column;

a second vertical rail on the second front column; and a palletiser coupled to the first vertical rail and the second vertical rail, wherein the palletiser moves vertically on the first vertical rail and the second vertical rail and the palletiser loads and unloads the storage platforms from the first plurality of shelves and the second plurality of shelves.

13. The automated storage system of claim 12 further comprising:
a plurality of storage racks placed adjacent to the rear horizontal track wherein the plurality of storage racks includes storage shelves arranged in a vertical and a horizontal array and wherein the palletiser places the storage platforms on the storage shelves of the plurality of racks and the palletiser may remove storage platforms from the storage shelves of the plurality of racks.

14. The automated storage system of claim 11 further comprising:
a first vertical rail on the first front column;
a second vertical rail on the second front column; and
a palletiser coupled to the first vertical rail and the second vertical rail, wherein the palletiser moves vertically on the first vertical rail and the second vertical rail.

15. The automated storage system of claim 14 wherein the palletiser comprises a push mechanism for pushing a storage platform from one of the first plurality of shelves and one of the second plurality of shelves.

16. The automated storage system of claim 14 wherein the palletiser comprises a scissor mechanism for moving a storage platform onto and off of one of the first plurality of shelves and one of the second plurality of shelves.

17. The automated storage system of claim 11 further comprising:
a first motor coupled to the first upper pulley or the first lower pulley; and
a second motor coupled to the second upper pulley or the second lower pulley.

18. The automated storage system of claim 17 further comprising:
a controller coupled to the first motor and the second motor for controlling and synchronizing movements of the first motor and the second motor.

19. The automated storage system of claim 11 wherein the robotic vehicles comprise couplings for coupling to cylindrical structures extending from the storage platforms.

20. The automated storage system of claim 11 wherein a storage platform is transported by two robotic vehicles, a first robotic vehicle and a second robotic vehicle, and the shelves are configured to remove the storage platform from the first robotic vehicle and the second robotic vehicle.

* * * * *